Jan. 26, 1971   H. B. ARSEM   3,559,027
ELECTRIC SHOCK ABSORBER
Filed Sept. 27, 1967

INVENTOR
*Harold B. Arsem*

3,559,027
ELECTRIC SHOCK ABSORBER

Harold B. Arsem, 5119 Shimerville Road, Clarence, N.Y. 14031

Filed Sept. 27, 1967, Ser. No. 671,038
Int. Cl. H02j 7/32
U.S. Cl. 320—61 4 Claims

ABSTRACT OF THE DISCLOSURE

An electric shock absorber for automobiles and the like which converts the mechanical energy supplied to the shock absorber to electricity for charging a battery, rather than wasting it as heat.

As an automobile travels down the road, much of the power applied to the drive train by the engine goes to move the car forward. However, a fair amount of this power is wasted as the car bounces up and down or jiggles over bumps or irregularities in the pavement. In accordance with present practice, automobiles are supported on springs or the like, augmented by shock absorbers, which mainly are hydraulic units. Such a shock absorber is built in two parts as an oil-filled piston and cylinder. As the two parts of the shock absorber move relative to each other, being respectively anchored to a part of the auto body and to the suspension, the oil moves through throttling valves to inhibit the movement of the two parts of the shock absorber relative to one another, the energy supplied to the shock absorber being converted into heat and dissipated.

The principal object of the present invention is to convert the mechanical energy applied to automotive and the like shock absorbers into useful energy.

More specifically, it is an object of the present invention to provide a shock absorber in the form of an electric generator which converts the mechanical energy applied thereto into electrical energy for charging an automobile storage battery or the like.

Gasoline engines as commonly used in automobiles exhaust large amounts of pollutants into the air. This is a particular problem in cities and other congested areas wherein the concentration of automotive exhaust pollutants in the air causes smog with the attendant known disadvantages thereof. Considerable effort and research is going into the production of electric automobiles which will not exhaust pollutants into the air. Up until this time, the amount of energy that can be stored in known batteries is sufficiently limited that electric automobiles are severly limited as to range, speed, and power. This problem can be attacked through the provision of batteries of larger storage capacity, or through more efficient use of energy.

In accordance with my present invention, efficient use is to be made of energy. Thus, instead of dissipating as heat the mechanical energy applied to automotive shock absorbers, it is my intention to provide an electric shock absorber that will convert the mechanical energy applied to the shock absorbers into electrical energy at least partially to recharge the storage battery or batteries. Such recharging will have some value in conventional automobiles using gasoline engines and storage batteries for supplying electrical needs, but will have particular utility in connection with electric automobiles wherein the drive force is provided by one or more electric motors operated by storage batteries and wherein any charge that can be applied to the batteries is critical. In accordance with the concepts of my invention, such shock absorbers may be electromechanical units, using adaptations of known coil and magnet generators; or other forms of electrical generators may be used, such as piezoelectric generators.

Additional objects, advantages, and features of the present invention will be apparent from the following description when taken in connection with the accompanying drawings wherein:

FIG. 1 is a somewhat schematic side view of an automobile having electric shock absorbers in accordance with the present invention;

FIG. 2 is a block diagram illustrating the essentials of the invention;

FIG. 3 is a somewhat schematic perspective view with parts broken away showing elements of one form of electric shock absorber; and FIG. 4 is a view similar to FIG. 3 on a slightly enlarged scale showing another form of electric shock absorber.

Turning now in greater particularity to the figures of the drawings, and first to FIG. 1, there will be seen an automobile 20 shown somewhat schematically and including a body 22 and wheels 24 supported therefrom as by the usual spring suspensions (not shown). The wheels are conventionally arranged two toward the front of the body and two toward the back of the body, and at least one pair of wheels is driven by a suitable engine or motor, gasoline or electric or other, not shown. Each wheel or suspension has a shock absorber 1 connected between it and a fixed point on the body, whereby up and down movement of the wheels causes telescoping in and out of the shock absorbers. As is set forth hereinafter, each shock absorber comprises an electric generator, and each is connected by means of wires 26 to a control unit and rectifier 2. The control unit and rectifier is in turn connected by wires 28 to a battery 3 which is a storage battery, and may be of known design.

The eletctrical layout of the invention will be seen in FIG. 2, wherein the shock absorber generators are indicated in the box 1, being connected by the wires 26 to the control unit and rectifier 2, the latter being connected by the wires 28 to the battery 3.

Although other forms of electric shock absorbers may be used, one exemplary shock absorber 1 is illustrated in FIG. 3, comprising a generally cylindrical upper shell 30 open at the bottom and having an eyelet 32 at its upper end for pivotal connection to a fixed position on the car body. The electric shock absorber also includes a generally cylindrical lower shell 34 telescopingly received within the upper shell 30, and having at its lower end an eyelet 36 for pivotal connection to a point on the wheel suspension. As will be apparent, upon up and down movement of the wheel the lower shell 34 will move up and down within the upper shell 30.

A stator or coil structure 4 incorporating any necessary iron pole structure is secured within the upper shell 30. A pair of wires extends through the shell from the coil structure 4 to the control unit and rectifier 2, as previously noted.

A spiral screw 5 is fixed to the lower shell 34 and upstands coaxially within the shells 30 and 34, extending through the coil structure 4. A permanent magnet rotor structure 38 is mounted within the stator 4 by any suitable structure permitting rotation of the rotor 38 relative to the stator, but precluding relative axial movement. The screw 5 has a spiral of rather long lead, and is connected to the rotor 38 by means such as a star-shaped disc, so that as the screw moves up and down relative to the rotor, the relative longitudinal motion is converted into rotary motion of the rotor, thereby causing an electric current to be generated in the stator 4, which current is applied by means of the wires 26 to the control unit and rectifier. As will be appreciated, the alternate up and down relative motion will result in generation of alternating current, but this is converted into direct current by the rectifier and used to charge the battery 3. Resistance can be introduced into the circuit as desired or necessary in the control unit, whereby to vary the load applied to the shock absorber, and hence to control the stiffness of the ride.

Figure 1:
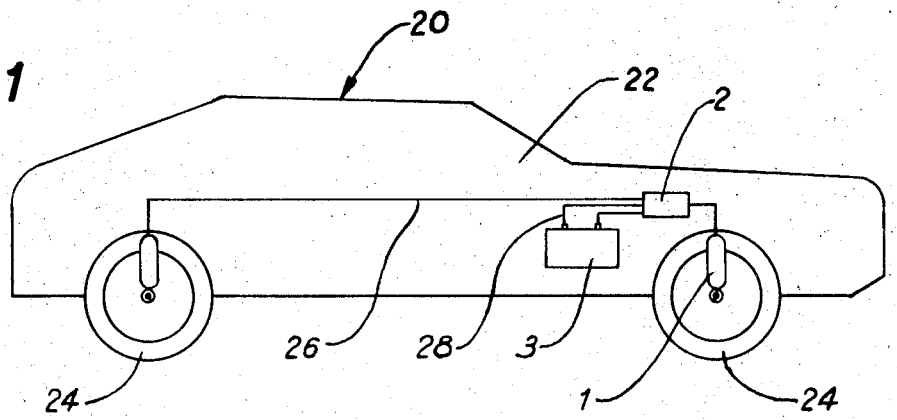
Figure 2:
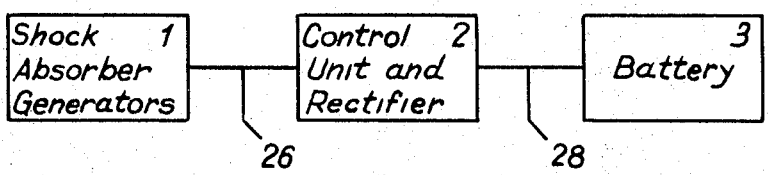
Figure 3:
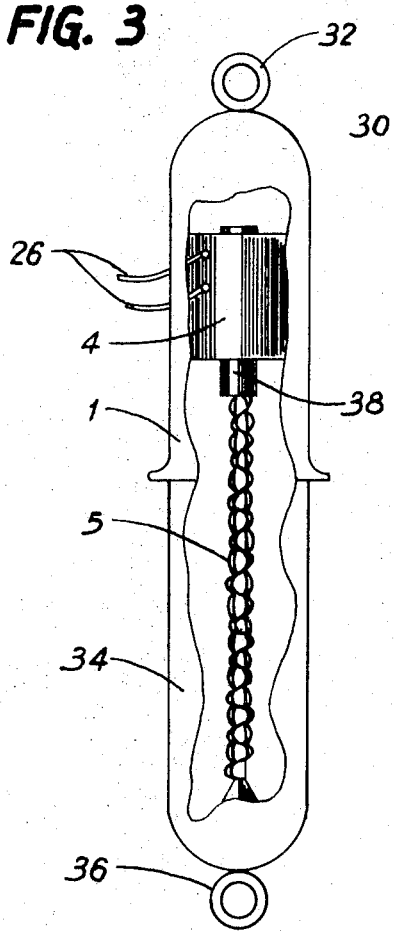

In the shock absorber of FIG. 3 the relative linear motion is converted into relative rotary motion for generation of electric current. In the modification shown in FIG. 4, the linear motion is used directly, without conversion to rotary motion. Many of the parts are similar, and, again, there are two relatively telescoping generally cylindrical shells 40 and 42, respectively, having eyelets 44 and 46 for connection to the auto body and wheel suspension. The shell 42 has a coaxial post 48 fixed therein, and this port carries three axially spaced permanent magnets 6. Each of the magnets 6 passes axially through a corresponding stator structure 7 supported in similar axially spaced relation by the shell 40 and including suitable iron poles and coil windings 9. The two upper stator structures 7 are partially broken away in order better to show the permanent magnets 6. The coil structures are interconnected by wires (not shown), and wires 26 exit through the shell 42 and lead to the control unit and rectifier 2. A guide sleeve 8 is secured to the shell 40 for insuring proper centralizing or alignment of the post 48, forming a sliding fit therewith.

Figure 4:
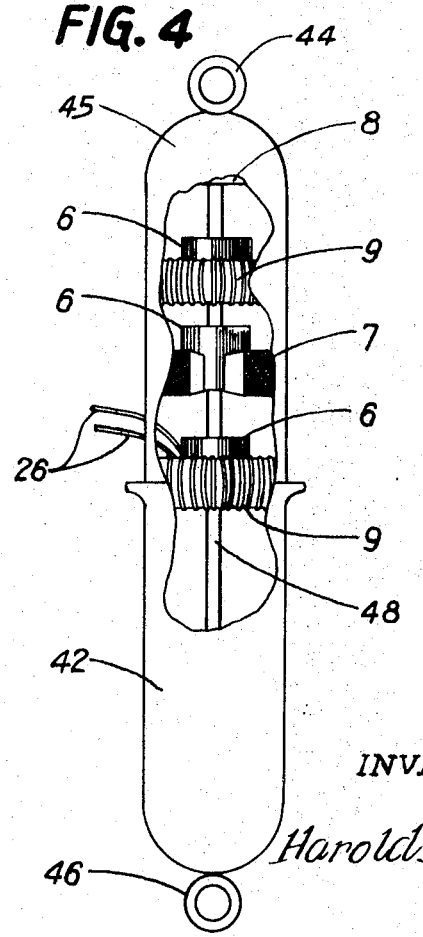

In the shock absorbers of both FIGS. 3 and 4 it will be appreciated that the shells are made of steel, and hence form a magnetic return path for the generator circuit. Various other forms of electromagnetic generators could be used, or other types of electric generators, such as piezoelectric devices, could be used. The important thing is that the mechanical energy imparted to the shock absorbers is converted into usable electric energy, rather than simply dissipated as heat as is current practice. By this means, the storage battery of a conventional gasoline engine car can be better maintained charged, particularly in conditions of stop and go traffic, and the range of an electric automobile can be materially extended.

The specific examples of the invention as herein shown and described are for illustrative purposes only. Various changes in structure will no doubt occur to those skilled in the art, and will be understood as forming a part of the present invention insofar as they fall within the spirit and scope of the appended claims.

The invention is claimed as follows:

1. In an automotive vehicle having a body and wheels mounted for up and down motion relative to said body, the combination comprising a storage battery, a plurality of shock absorbers each respectively mounted between a wheel and said body, each said shock absorber having a housing with at least two co-axially mounted parts relatively movable along the axis and electric generator means mounted within said housing and respectively connected to said relatively movable parts for converting mechanical energy supplied to said shock absorber to electric energy, and electric means connecting said shock absorber electric generator means to said storage battery at least partially to charge said battery.

2. The combination as set forth in claim 1 wherein the electric means comprises means for varying the load on the electric generator means and hence the stiffness of the shock absorber.

3. The combination as set forth in claim 1 wherein the generator means generates alternating current and wherein the electric means includes rectifier means for converting the alternating current to direct current.

4. In an automotive vehicle having a body and wheels mounted for up and down motion relative to said body, the combination comprising a plurality of shock absorbers each respectively mounted between a wheel and said body, each said shock absorber having a housing with at least two co-axially mounted parts relatively movable along the axis and electric generator means mounted within said housing and respectively connected to said relatively movable parts for converting mechanical energy supplied to said shock absorber to electric energy, and electric load means connected to said shock absorber electric generator means and having means for varying the load applied to said electric generator means, and hence varying the stiffness of the shock absorber.

References Cited

UNITED STATES PATENTS

| | | | |
|---|---|---|---|
| 1,397,879 | 11/1921 | Pillmore | 180—65 |
| 1,557,570 | 10/1925 | Eckman et al. | 180—65X |
| 1,574,095 | 2/1926 | Jokisch | 180—65 |
| 2,900,592 | 8/1959 | Baruch | 322—3 |
| 2,973,969 | 3/1961 | Thall | 188—88EX |

J D MILLER, Primary Examiner

J. M. GUNTHER, Assistant Examiner

U.S. Cl. X.R.

180—65; 310—15; 322—3